(12) United States Patent
Korthals

(10) Patent No.: US 7,401,456 B2
(45) Date of Patent: Jul. 22, 2008

(54) HORIZONTALLY RETRACTABLE MOWER DECK

(75) Inventor: Douglas Dean Korthals, Fuquay-Varina, NC (US)

(73) Assignee: Deere & Company, Moline, IL (US)

( * ) Notice: Subject to any disclaimer, the term of this patent is extended or adjusted under 35 U.S.C. 154(b) by 133 days.

(21) Appl. No.: 11/268,818

(22) Filed: Nov. 8, 2005

(65) Prior Publication Data

US 2007/0101693 A1 May 10, 2007

(51) Int. Cl.
*A01D 75/18* (2006.01)

(52) U.S. Cl. ........................................ 56/10.4

(58) Field of Classification Search ............ 56/10.4, 56/13.6, 15.2, 6, 7, 14.9, 15.5
See application file for complete search history.

(56) References Cited

U.S. PATENT DOCUMENTS

| | | | | |
|---|---|---|---|---|
| 2,960,811 A * | 11/1960 | Roesel | ................. | 56/10.4 |
| 3,397,521 A * | 8/1968 | Danuser | ................. | 56/11.9 |
| 3,400,521 A * | 9/1968 | Caldwell | ................. | 56/6 |
| 3,473,302 A * | 10/1969 | Caldwell | ................. | 56/6 |
| 3,500,619 A * | 3/1970 | Bacon | ................. | 56/6 |
| 3,563,011 A * | 2/1971 | Bramley et al. | ................. | 56/7 |
| 3,608,284 A * | 9/1971 | Erdman | ................. | 56/6 |
| 3,665,685 A * | 5/1972 | Allard | ................. | 56/10.4 |
| 3,736,735 A * | 6/1973 | Kulak et al. | ................. | 56/13.6 |
| 3,797,209 A | 3/1974 | Davis | | |
| 4,858,417 A * | 8/1989 | Priefert et al. | ................. | 56/6 |
| 4,936,391 A * | 6/1990 | Cameron | ................. | 172/78 |
| 5,241,808 A * | 9/1993 | Colistro | ................. | 56/6 |
| 5,249,411 A * | 10/1993 | Hake | ................. | 56/11.6 |
| 5,321,938 A * | 6/1994 | LeBlanc | ................. | 56/6 |
| 5,343,683 A * | 9/1994 | Friesen | ................. | 56/320.1 |
| 5,715,667 A * | 2/1998 | Goman et al. | ................. | 56/13.6 |
| 6,308,503 B1 | 10/2001 | Scag et al. | ................. | 56/6 |
| 6,494,026 B1 * | 12/2002 | Schmidt | ................. | 56/15.2 |
| 7,089,722 B2 * | 8/2006 | Laskowski | ................. | 56/14.9 |

OTHER PUBLICATIONS

European Search Report, Feb. 1, 2007, 4 Pages.

* cited by examiner

*Primary Examiner*—Árpád Fábián-Kovács

(57) ABSTRACT

A variable width mower deck has three cutting chambers mounted under a top deck surface. Two of the cutting chambers may be moved between a retracted cutting position and an extended cutting position. An endless belt engages the pulleys on each spindle to rotate the rotary cutting blades. The left and right cutting chambers move between the retracted and extended positions while maintaining engagement between the endless belt and the pulleys.

17 Claims, 8 Drawing Sheets

HORIZONTALLY RETRACTABLE MOWER DECK

FIELD OF THE INVENTION

The present invention relates to grass mowing equipment, and more specifically to mower decks having variable cutting widths.

BACKGROUND OF THE INVENTION

Grass mowing equipment typically includes a mower deck having a fixed cutting width of 32 inches or more. In many applications it is desirable to have a mower that can cut a relatively wide path of grass to efficiently handle large lawns and fields. Commercial landscapers may prefer to use the largest width mower deck in order to cut the grass in as short a time as possible. The cost and time of mowing can be substantially reduced by using a mower with a wide cutting path.

Some areas of grass may be enclosed by a fence having only a narrow gate or passageway for entering and exiting the area. Grass mowing equipment also may need to travel over narrow bridges or underpasses. Additionally, grass mowing equipment may need to move on public roadways, or be carried on vehicles or trailers, that have width limitations. Therefore, it may be impractical or impossible to use a mower having a relatively wide fixed width mower deck in these applications. Instead, only lawn mowers having smaller width mower decks, such as less than 32 or 36 inches, may be needed for such applications. The narrow cutting width may decrease mowing efficiency and increase the time for mowing.

Grass mowing equipment used to cut large areas may have three or more rotary cutting blades under the deck. The deck width may depend on the length of each rotary cutting blade, and the position and configuration of the cutting chambers under the deck. The blades may be positioned in cutting chambers that cut grass in overlapping swaths so that no uncut strip is left. For example, a mower deck with three cutting blades may have a center cutting blade positioned in front of, and overlapping with, the left and right cutting blades.

U.S. Pat. No. 6,308,503 relates to a convertible width lawn mower having a rotatable wing section pivotally attached to the mower deck. The wing section can move between a substantially horizontal operating position and a substantially vertical non-operating position. The wing section may be manually rotated upwardly and secured in the vertical position so that the effective width of the mower deck may be reduced. The cutting blades are automatically disengaged from the engine when raised from a mowing position to a transport position. The danger posed by the raised wing section's exposed cutting blade, may be reduced by including a safety device or interlock to prevent the cutting blade from being driven by the engine when the wing section is raised. Additionally, a caster wheel attached to the wing section may be pivoted out of the way when the wing section is raised to the transport position. The convertible width lawn mower does not cut grass when the mower deck wing section is raised to the narrowed, transport position.

A grass mowing machine is needed with a mower deck that may be narrowed in width without disengaging the cutting blades from the engine. A grass mowing machine is needed that can be used for cutting grass at two or more different deck widths. A mower deck is needed having a variable cutting width.

SUMMARY OF THE INVENTION

The invention provides a grass mowing machines with a retractable mower deck. The mower deck may be narrowed in width without disengaging the cutting blades from the engine. The grass mowing machine can be used for cutting grass at two or more different deck widths. The mower deck has a variable cutting width.

DESCRIPTION OF THE PREFERRED EMBODIMENT

Figure 1:
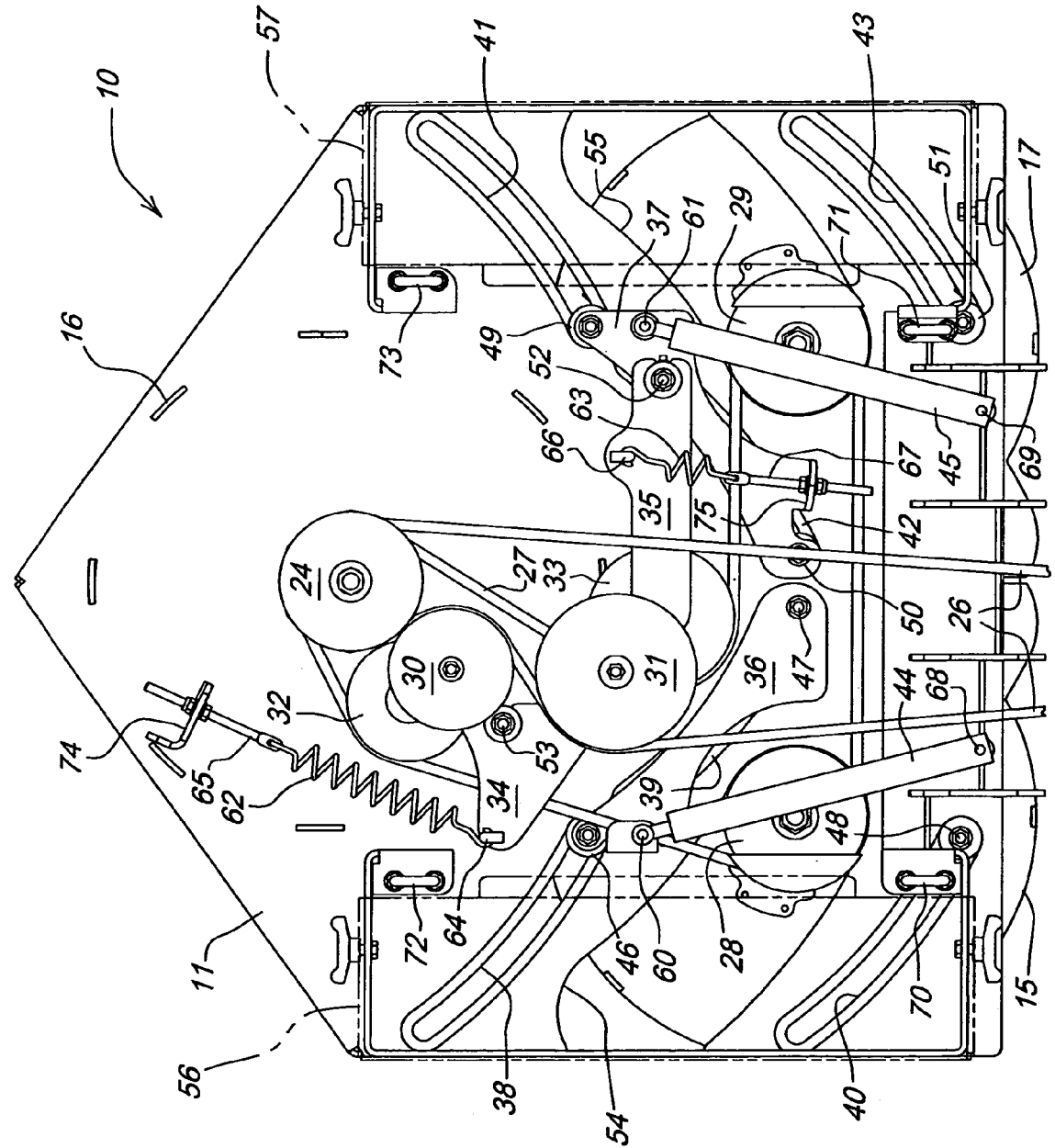
FIG. 1 is a top view of a retractable mower deck in the retracted position according to a first embodiment of the invention.
Figure 2:
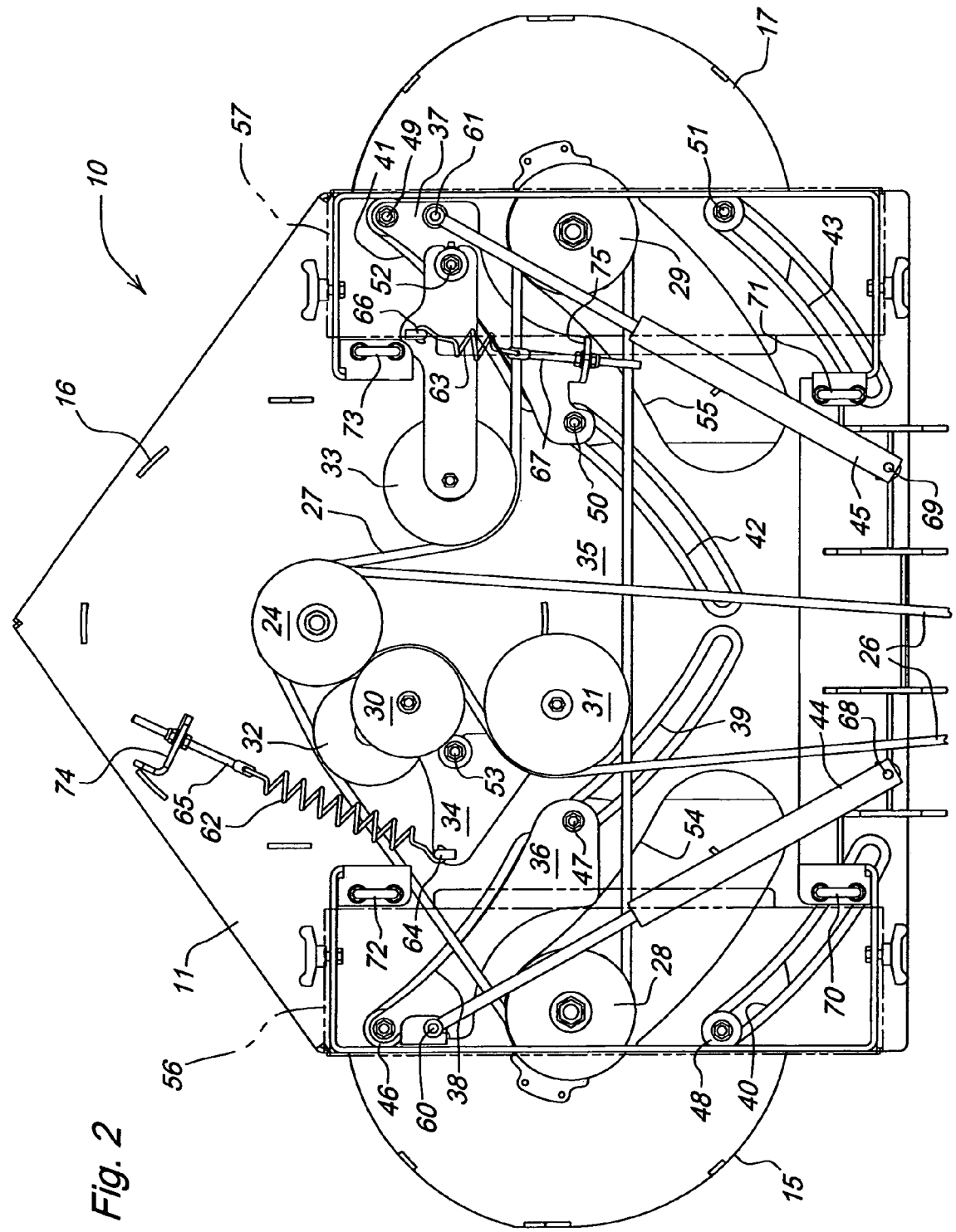
FIG. 2 is a top view of a retractable mower deck in the fully extended position according to a first embodiment of the invention.
Figure 3:
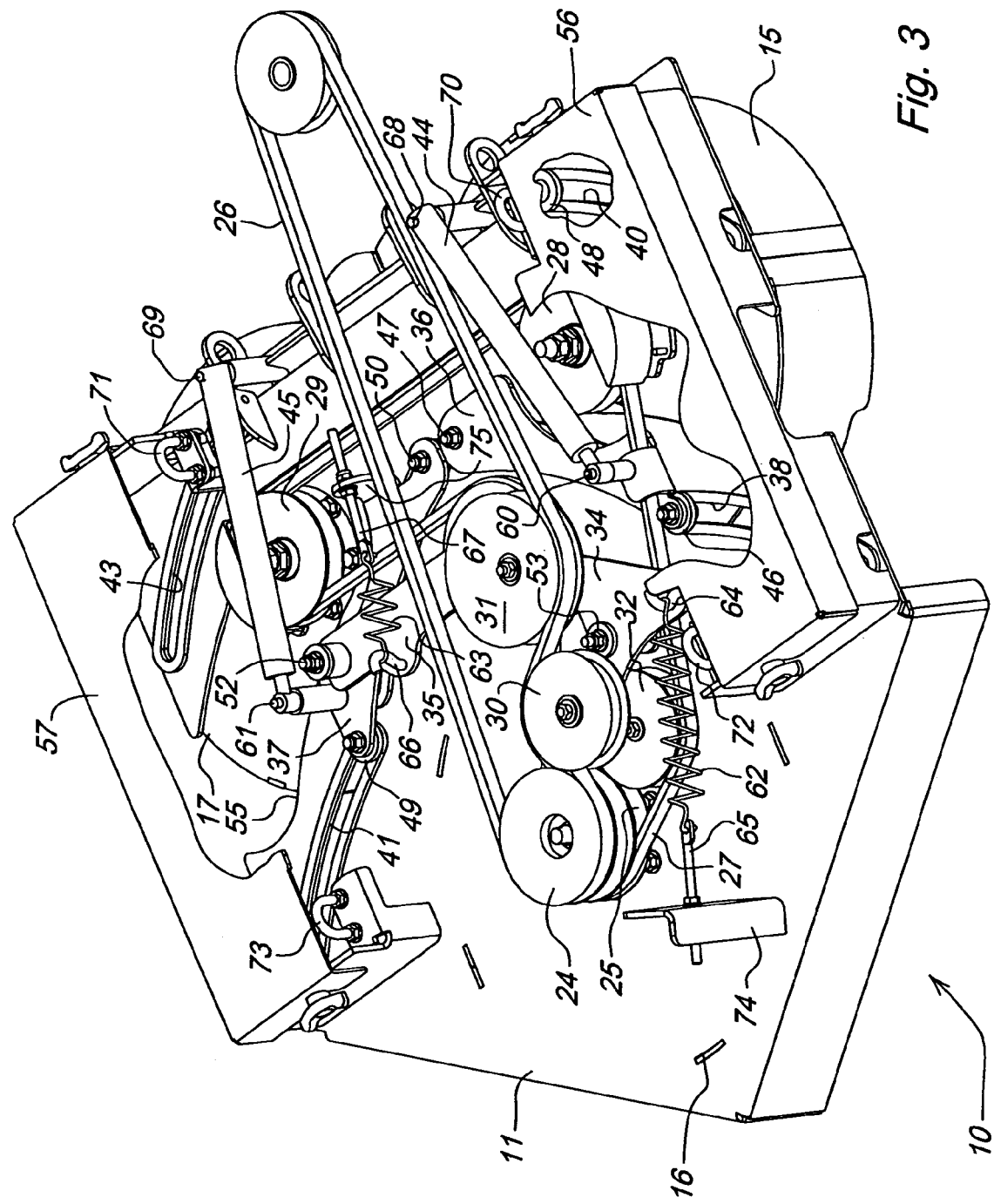
FIG. 3 is a perspective view of a retractable mower deck in the retracted position according to the first embodiment.
Figure 4:
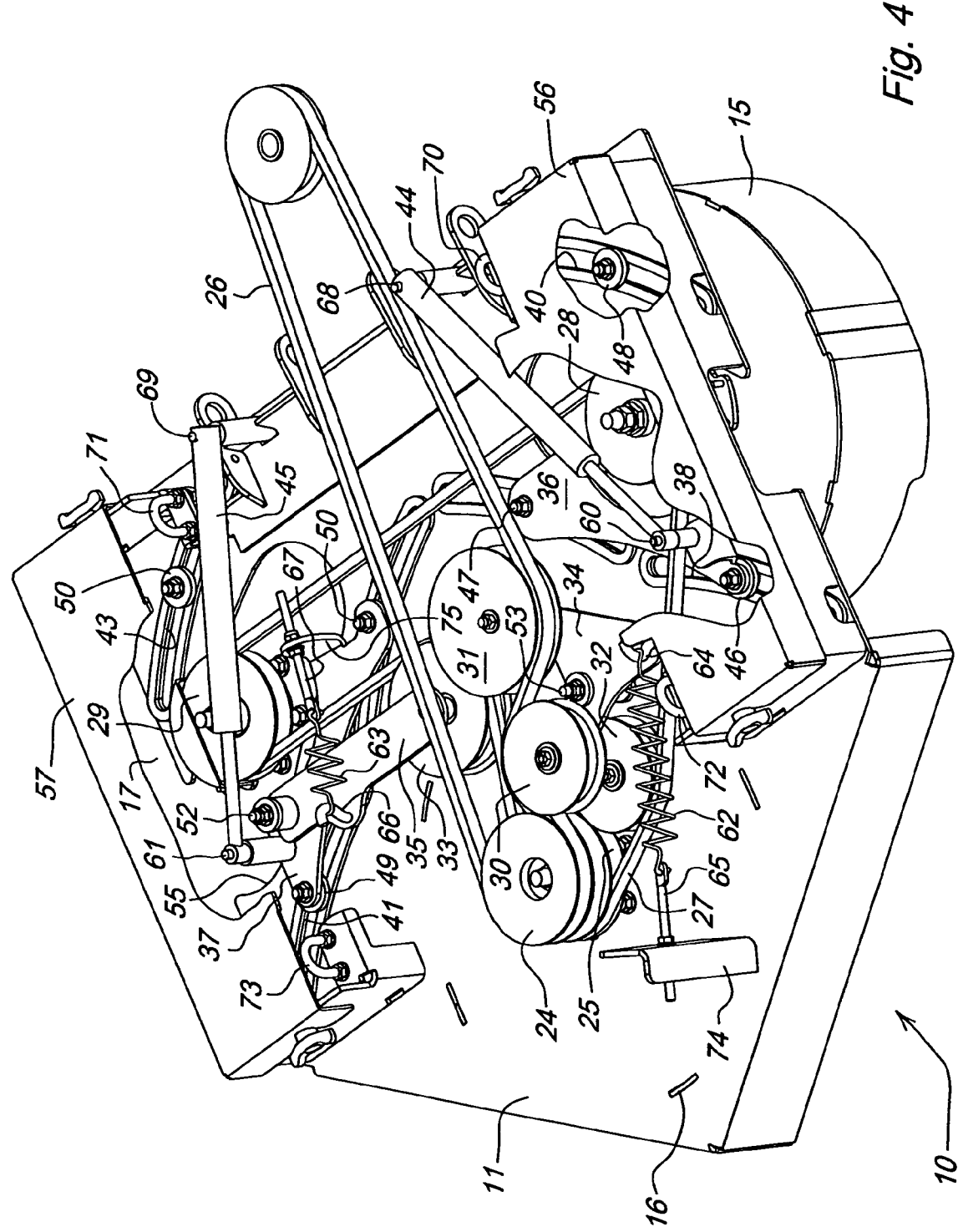
FIG. 4 is a perspective view of a retractable mower deck in an intermediate, partially retracted position, according to the first embodiment.
Figure 5:
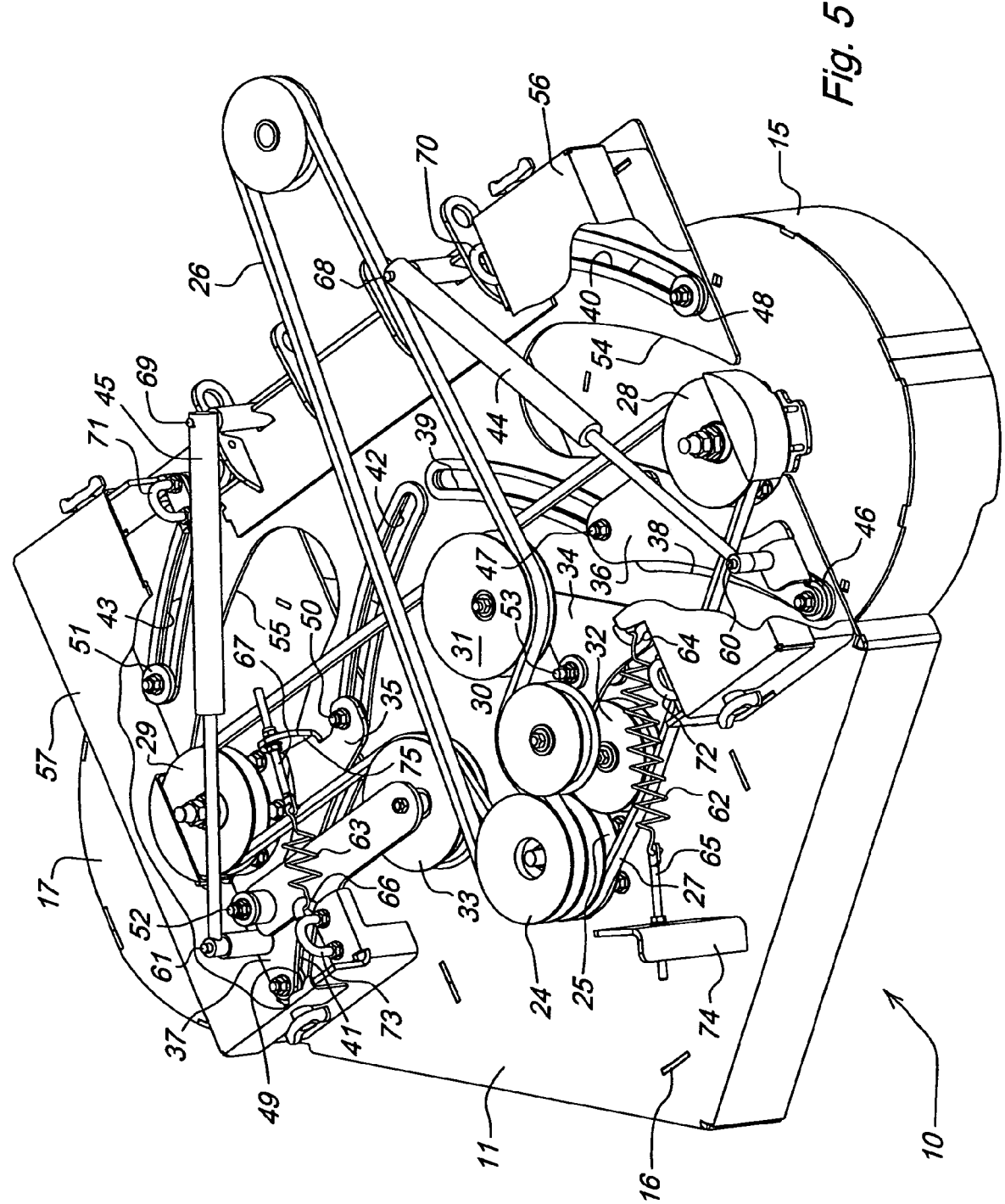
FIG. 5 is a perspective view of a retractable mower deck in a fully extended position according to the first embodiment.
Figure 6:
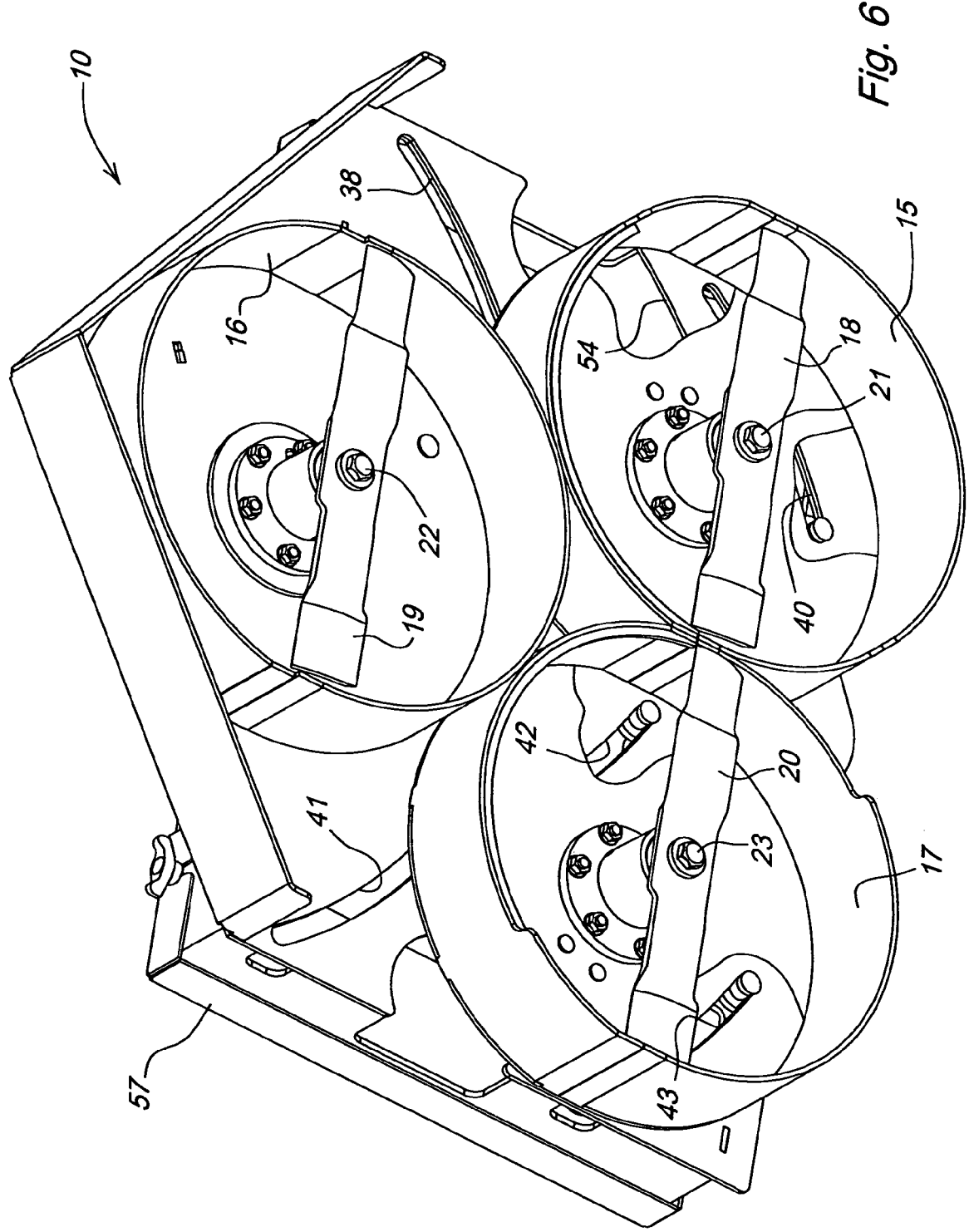
FIG. 6 is a bottom view of a retractable mower deck according to the first embodiment.
Figure 7:
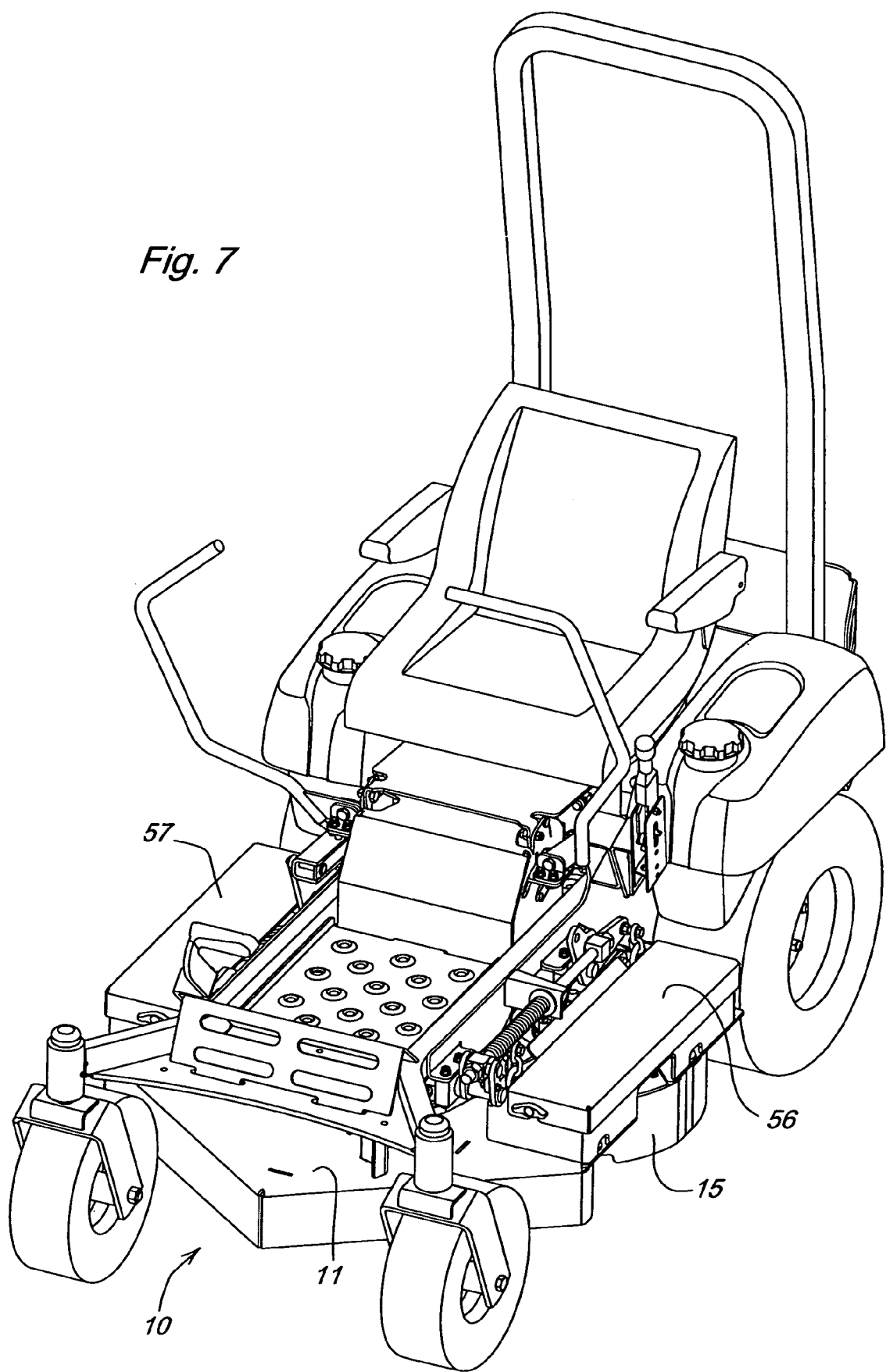
FIG. 7 is a perspective view of a grass mowing machine having a retractable mower deck in the retracted position according to a first embodiment of the invention.

A first embodiment of retractable mower deck 10, shown in FIGS. 1-7, may be used with a lawn and garden tractor, riding mower or other vehicle having an operator station. Retractable mower deck 10 may be mid-mounted to the chassis of a tractor, mower or other vehicle between the front and rear wheels. Alternatively, the retractable mower deck may be front or rear mounted, suspended from a frame, or may be used with a walk behind mower. The retractable mower deck may be connected to and/or suspended from the frame in a conventional manner so the deck may be raised and lowered to desired cutting heights. An internal combustion engine or other power source may be mounted on the frame and may transmit rotational power to cutting blades under the retractable mower deck.

In one embodiment, retractable mower deck 10 may be configured so that both the left and right cutting chambers (along with the blades in those cutting chambers) may be selectively shifted to move between a retracted position and an extended position. The center, non-moving cutting chamber may remain stationary while the left and right cutting chambers shift between the retracted and extended positions. Optionally, the left and right cutting chambers also may be shifted to one or more intermediate positions. The same controls may be used to shift both the left and right cutting chambers between the retracted and extended positions.

In one embodiment, retractable mower deck 10 may be operated to rotate all of the rotary cutting blades to cut grass in both the retracted and extended positions. The retractable mower deck also may be operated to cut grass in one or more intermediate positions. The two moving cutting chambers may be shifted between the retracted and extended positions while continuing operation; i.e., without shutting off the engine, drive apparatus, or rotary cutting blades.

In one embodiment, in the retracted position, the cylindrical outer perimeters of the left and right cutting chambers may be in contact or close proximity with each other. For example, in the retracted position, the overlap between the swaths cut by blades in each of the left and right cutting chambers and the swath cut by the blade in the center cutting chamber may be at least about forty percent of the diameter of each cutting chamber. In the extended position, there may be a smaller overlap between the swaths cut by blades in each of the left and right cutting chambers and the swath cut by the blade in center cutting chamber. For example, the overlap in the extended position may be less than about twenty percent of the diameter of each cutting chamber.

In one embodiment, retractable mower deck 10 may have a top surface or cover 11 over three cutting chambers 15, 16, 17. Each cutting chamber 15, 16, 17 may be generally cylindrical in shape with an outer wall or perimeter surface that encloses a rotary cutting blade 18, 19, 20 mounted to the lower end of a generally vertical spindle 21, 22, 23. One or more of the cutting chambers optionally may include an opening for discharge or collection of grass clippings, or may be enclosed to recirculate and mulch the clippings.

In one embodiment, retractable mower deck 10 may be configured so that the center or non-moving cutting chamber 16 may be in a forward position, and between the left and right or moving cutting chambers 15, 17. As a result, the left and right cutting blades 18, 20 may be positioned to cut swaths overlapping the swath cut by the center cutting blade 19. The extent of overlap between the cutting chambers may be varied as the left and right chambers move or shift between the retracted and extended positions.

In one embodiment, the upper end of center spindle 22 may have a first or top pulley 24 and a second or lower pulley 25 mounted thereto. Belt 26 may transmit rotational power from an engine drive shaft to the center spindle via first pulley 24. Belt 27 may transmit rotational power from second pulley 25 to pulleys 28, 29 on the left and right spindles respectively. Pulleys 30 and 31 may engage and provide needed tension, and permit selective engagement or disengagement of belt 26 between the engine drive shaft and pulley 24. Similarly, pulleys 32 and 33 may provide needed tension, and permit selective engagement or disengagement of belt 27 between pulley 25 and pulleys 28, 29.

In one embodiment, belt 27 may remain engaged by pulleys 25, 28, 29, 32 and 33 when the retractable mower deck is moved between the retracted and fully extended positions. Belt 27 also may remain engaged by pulleys 25, 28, 29, 32 and 33 when the retractable mower deck is in one or more intermediate positions. As a result, the retractable mower deck may be operated to rotate all of the cutting blades at two or more cutting widths.

The pulleys may continue to engage belt 27 as the pulleys move along with a cutting chamber between the retracted and extended positions. For example, in one embodiment, pulleys 30 and 31 may be mounted to pivot arm 34, and pulley 32 may be mounted to the top surface of the mower deck. Pivot arm 34 may be pivotably mounted on pivot post 53 which may be secured to the top surface of the mower deck. Spring 62 may urge pivot arm 34 and pulleys 30, 31 to pivot toward engagement with belt 26. Spring 62 may extend between spring hook 64 (on pivot arm 34) and adjustable spring anchor 65 mounted to bracket 74 on the top surface of the mower deck.

In one embodiment, pulley 33 may be mounted to pivot arm 35. Pivot arm 35 may be pivotably mounted on pivot post which may be secured to right sliding arm 37. Spring 63 may urge pivot arm 35 and pulley 33 to pivot toward engagement with belt 27. Spring 63 may extend between spring hook 66 and adjustable spring anchor 67 mounted to bracket 75 on right sliding arm 37.

In one embodiment, fasteners 46, 47 and 48 may be attached to the top of the left cutting chamber. Fasteners 46, 47 and 48 may extend from the top of the left cutting chamber upwardly through slots 38, 39 and 40 in the top surface 11 of the mower deck. Fasteners 46, 47 and 48 may hold the left cutting chamber to the mower deck. Each fastener 46, 47 and 48 may include a follower that slides within a respective slot 38, 39 and 40 as the left cutting chamber is moved between a retracted and a fully extended position. Each slot 38, 39 and 40 may have a curved or arcuate shape. Above the followers and the slots, fasteners 46 and 47 may be connected to the opposing ends of left sliding plate 36.

Various device may be used to move the left and right cutting chambers between the retracted and extended positions. For example, a hand crank, an electrical linear actuator or a hydraulic cylinder may be used.

Figure 8:
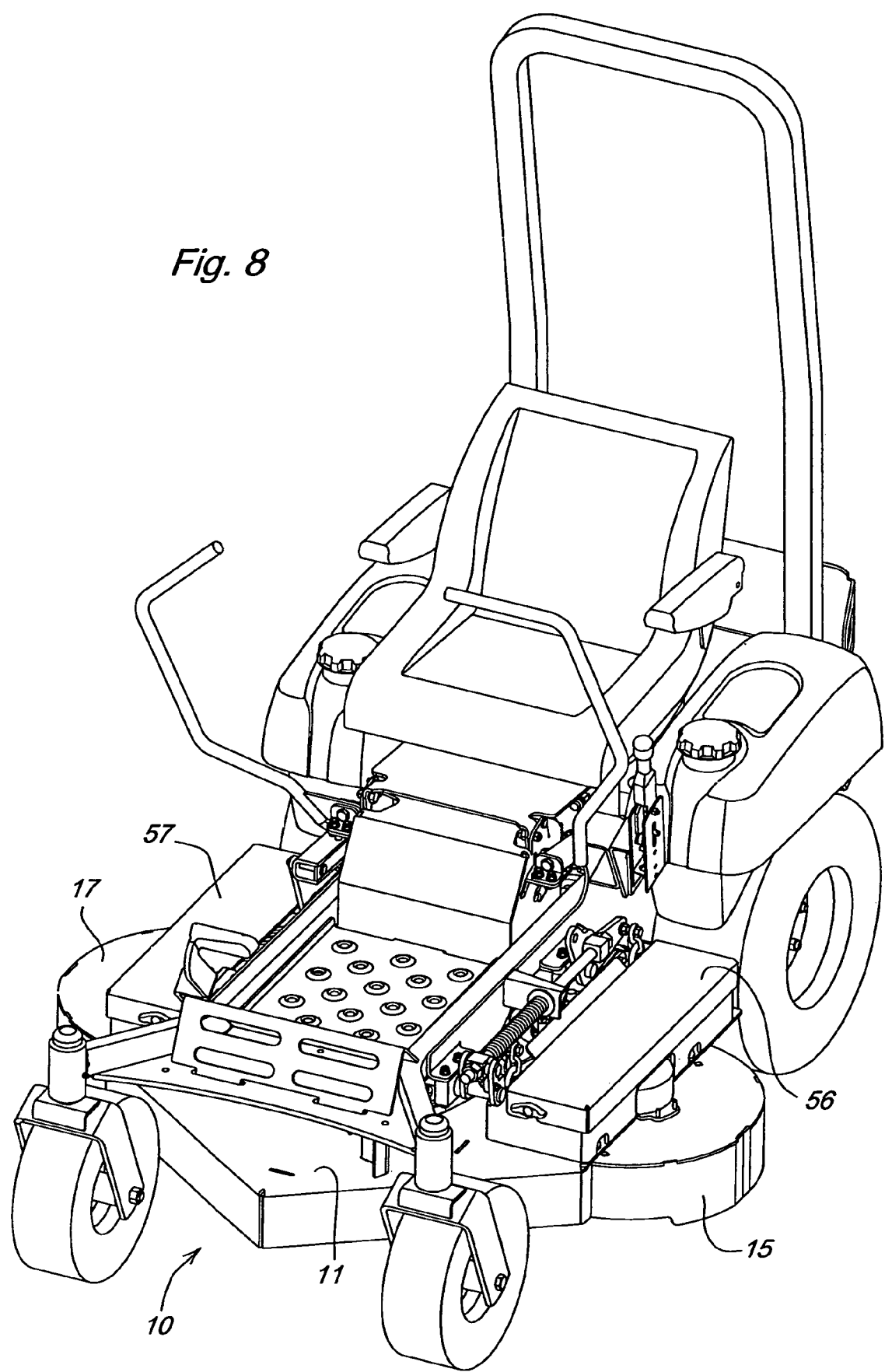
FIG. 8 is a perspective view of a grass mowing machine having a retractable mower deck in the extended position according to a first embodiment of the invention.

In the embodiment shown in FIG. 1-8, hydraulic cylinder 44 may be connected between post 60 on left sliding plate 36 and pivot mount 68 at the rear of the mower deck. Hydraulic cylinder 44 may be in fluid communication with a source of pressurized hydraulic fluid to selectively move the hydraulic cylinder and thereby move the left cutting chamber between the retracted and extended positions. The hydraulic cylinder may extend to urge the left sliding plate outwardly and the left cutting chamber toward an extended position, or retract to urge the left sliding plate inwardly and the left cutting chamber toward the retracted position.

In one embodiment, fasteners 49, 50 and 51 may be attached to the top of the right cutting chamber. Fasteners 49, 50 and 51 may extend from the top of the right cutting chamber upwardly through slots 41, 42 and 43 in the top surface 11 of the mower deck. Fasteners 49, 50 and 51 may hold the right cutting chamber to the mower deck. Each fastener 49, 50, 51 may include a follower that slides within a respective slot 41, 42 and 43 as the right cutting chamber is moved between a retracted and a fully extended position. Each slot 41, 42 and 43 may have a curved or arcuate shape. Above the followers and the slots, fasteners 49 and 50 may be connected to the opposing ends of right sliding plate 37.

In one embodiment, hydraulic cylinder 45 may be connected to post 61 on right sliding plate 37 to move the right cutting chamber between the retracted and extended positions. Hydraulic cylinder 45 may be connected between post 61 on right sliding plate 37 and pivot mount 69 at the rear of the mower deck. Hydraulic cylinder 45 may be in fluid communication with a source of pressurized hydraulic fluid to selectively move the hydraulic cylinder and the right cutting chamber between the retracted and extended positions. The hydraulic cylinder may extend to urge the right sliding plate outwardly and the right cutting chamber toward an extended position, or retract to urge the right sliding plate inwardly and the right cutting chamber toward the retracted position.

In one embodiment, the mower deck's top surface 11 may include a left channel 54 through which pulley 28 may project, allowing the pulley to continue to engage belt 27 as left cutting chamber is shifted between the retracted and extended positions. Similarly, pulley 29 may extend through right channel 55 so that the pulley may engage belt 27 as the right cutting chamber shifts between the retracted and extended positions.

In one embodiment, left shield 56 may extend at least partially over the left side of the mower deck, and right shield 57 may extend at least partially over the right side of the mower deck. The mower deck also may include support links 70, 71, 72 and 73 that may be attached or suspended from the vehicle frame.

Having described the preferred embodiment, it will become apparent that various modifications can be made without departing from the scope of the invention as defined in the accompanying claims.

The invention claimed is:

1. An apparatus comprising:
   a mower deck having a top surface and left, center and right cutting chambers under the top surface; a generally vertical spindle extending into each cutting chamber with a rotary cutting blade attached to a lower end of each spindle and a pulley attached to an upper end of each spindle;
   an endless belt engaging the pulleys on the upper end of each spindle to rotate the rotary cutting blades;
   controls to move the left and right cutting chambers between a retracted position and an extended position with respect to the center cutting chamber while maintaining engagement between the endless belt and the pulleys on the upper ends of the spindles; and
   hydraulic cylinders actuated by the controls and attached to each of the left and right cutting chambers to selectively shift horizontally both of the left and right cutting chambers, or either of the left and right cutting chambers, between the retracted and extended positions, or to intermediate positions between the retracted and extended positions.

2. The apparatus of claim 1 further comprising fasteners on the top of the left and right cutting chambers, each fastener extending upwardly through a slot in the top surface of the mower deck.

3. The apparatus of claim 2 further comprising followers on the fasteners that slide in the slots between the retracted and extended positions.

4. The apparatus of claim 1 wherein the overlap between the center cutting chamber and each of the left and right cutting chambers is at least about fourty percent of the diameter of the cutting chamber in the retracted position.

5. The apparatus of claim 1 wherein the retractable mower deck is mounted to a vehicle frame between a front pair of wheels and a rear pair of wheels.

6. A mower deck comprising:
   a center cutting chamber having a rotary cutting blade mounted to a generally vertical spindle for cutting a swath of grass;
   a left cutting chamber and a right cutting chamber mounted generally rearwardly and on each side of the center cutting chamber, the left and right cutting chambers each having a rotary cutting blade mounted to a generally vertical spindle for cutting swaths of grass;
   a pair of extendable cylinders for sliding the left and right cutting chambers between a retracted position in close proximity with each other to narrow the width of the mower deck, and an extended position spaced from each other to increase the width of the mower deck, the swaths cut by the blades in each of the left and right cutting chambers overlapping the swath cut by the blade in the center cutting chamber in both the retracted and extended positions; and
   an operator control connected to the pair of extendable cylinders on the mower deck to shift the left and right cutting chambers between the retracted position and the extended position.

7. The mower deck of claim 6 further comprising an endless belt engaging a pulley mounted to each of the spindles in both the retracted and extended positions.

8. The mower deck of claim 6 wherein the left and right cutting chambers cut swaths overlapping the swath cut by the blade in the center cutting chamber in an intermediate position between the retracted and extended positions.

9. The mower deck of claim 6 wherein each of the cutting chambers has a generally cylindrical perimeter at least partially under a top surface of the mower deck.

10. The mower deck of claim 6 wherein the swaths cut by the blades in the left and right cutting chambers overlap the swath cut by the blade in the center cutting chamber by at least fourty percent in the retracted position.

11. The mower deck of claim 6 further comprising at least two fasteners attached to each of the left and right mower decks, the fasteners having followers that slide in slots above the left and right cutting chambers between the retracted and extended positions.

12. An apparatus comprising:
    a grass mowing machine having a variable width mower deck with three cutting chambers mounted under a top deck surface; each cutting chamber housing a rotary cutting blade;
    two of the cutting chambers selectably moving between a retracted cutting position in which each of the blades in the two moving cutting chambers cut swaths that overlap a swath cut by the third non-moving cutting chamber, and an extended cutting position in which each of the blades in the two moving cutting chambers cut swaths that have a smaller overlap with the swath cut by the third non-moving cutting chamber; and
    operator actuated controls connecting to a pair of cylinders that are extendable and retractable to selectively shift either or both of the two moving cutting chambers between the retracted and extended cutting positions.

13. The apparatus of claim 12 wherein each of the blades in the three cutting chambers are interconnected for rotation by an endless belt in the retracted position and the extended position.

14. The apparatus of claim 12 wherein the top deck surface includes at least two slots above the two moving cutting chambers; each of the moving cutting chambers having a follower that slides in the slots between the retracted and extended positions.

15. The apparatus of claim 12 further comprising a pair of pulleys to rotate the cutting blades in the two moving cutting chambers, and at least one other pulley mounted to a pivot arm that moves with the cutting chambers between the retracted and extended positions.

16. The apparatus of claim 15 further comprising a belt that remains engaged by the pulleys between the retracted and extended positions.

17. The apparatus of claim 12 further comprising an engine rotating a shaft and a belt connected between the shaft and a spindle attached to the blade in the non-moving cutting chamber.

* * * * *